Sept. 12, 1967 W. JADICK 3,340,646
FLY TRAP
Filed Feb. 10, 1965
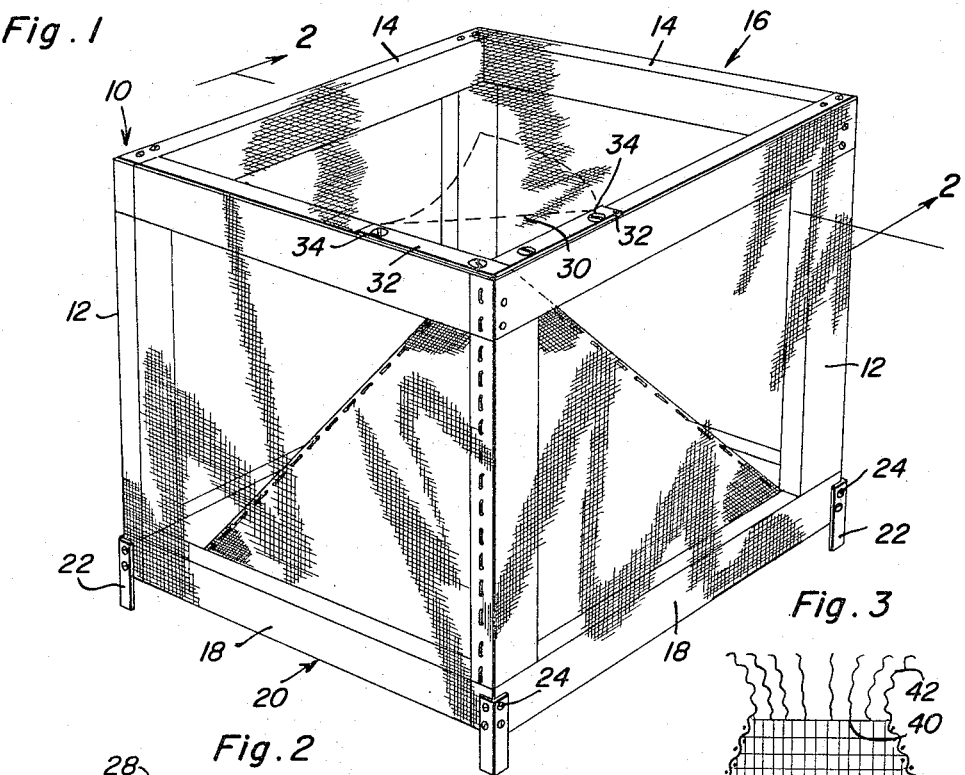
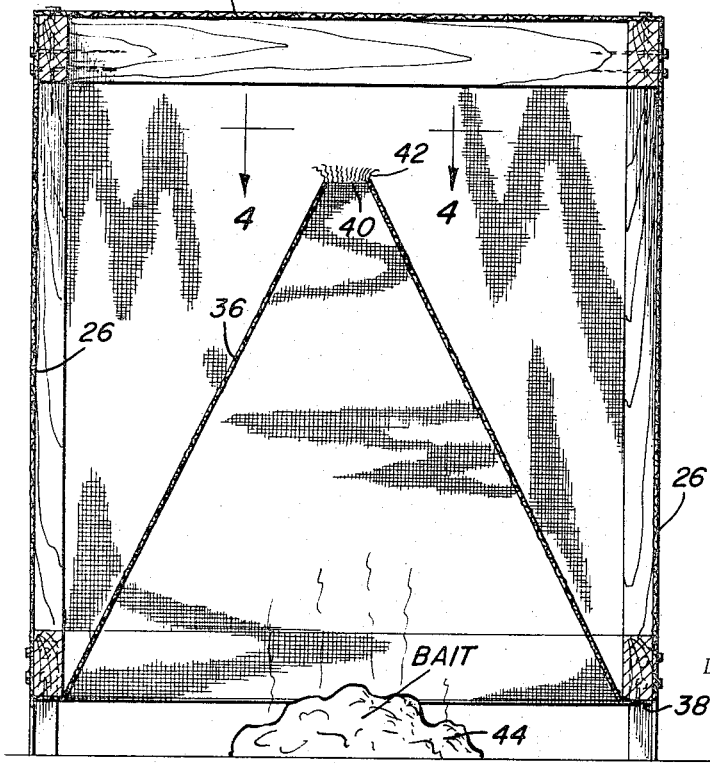
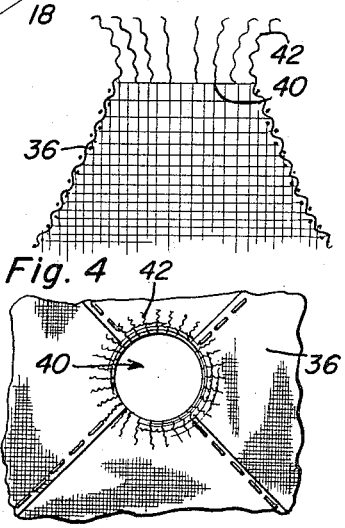
William Jadick
INVENTOR.

United States Patent Office 3,340,646
Patented Sept. 12, 1967

3,340,646
FLY TRAP
William Jadick, 213 Turnron Place,
East Peoria, Ill. 61611
Filed Feb. 10, 1965, Ser. No. 431,552
2 Claims. (Cl. 43—118)

ABSTRACT OF THE DISCLOSURE

The trap disclosed is characterized by a frame structure embodying horizontal top and bottom frames joined by vertical corner posts. The bottom frame is elevated by short legs. A first screen covers the top frame and has a corner flap for emptying trapped flies and insects. The four side screen panels span their respective side frames and (1) have lower ends fashioned into flanges which underlie the bottom frame members and (2) triangular flap-like extensions directed upwardly, marginally joined and transformed to define a truncated funneling leader. The exit of the leader has flared wire-ends providing an anti-escape guard.

---

This invention relates to insect traps and more particularly to that type of trap, in which the insects may freely enter, but when once inside are unable to readily find an exit. More particularly, this invention relates to a trap for holding and retaining flies.

Insects as a rule are controlled by domestic and municipal sanitation. It is important, however, that additional means be provided to combat these enemies of men, although concerted action of the community being essential, may be taken for granted. Some insects are only accidental, adventitious or mechanical carriers of disease germs, for instance, the house fly which may carry typhoid, others are specific carriers of particular diseases, the spread of disease being unusual or impossible without them. An example is the mosquito that carries malaria.

The housefly, *musca domestica*, is found in practically all parts of the world. It multiplies rapidly in warm weather. The mother fly lays her tiny white eggs on manure, garbage or other refuse or filth. From each egg hatches out a small white maggot (larva). This grows for four or five days and then changes into a brown motionless restless body (pupa). After four or five days the adult fly hatches out and takes to the air. The fly breeds in filth and feeds on filth. It comes to the kitchen and the table; it alights on the food or the body. The fly carries germs from filth to the body and to food and leaves them where it alights and rests. It frequently carries typhoid bacilli and other disease germs from excreta into drink, food and the body.

It is essential to understand these facts in attempting to control flies. Their breeding must be prevented by keeping manure, garbage, refuse and decaying matter in tightly covered containers so that flies cannot gain access to deposit their eggs. Flies must be trapped when they are present in large numbers, particularly if it is near the home. It is essential to keep the house carefully screened so that the flies that are about cannot enter the house.

It is the primary purpose of this invention to provide a suitable and domestic fly trap, which is easy and economical to manufacture.

It is a further object of this invention to provide a trap for trapping flies and the like that can be readily assembled with a minimum of labor.

A still further object of this invention is to provide a fly trap which has means thereon which discourage live flies moving about in the cage from escaping.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the fly trap of this invention;

FIGURE 2 is a cross sectional view of the fly trap taken substantially along section line 2—2 of FIGURE 1;

FIGURE 3 is an enlarged fragmental view of the apex of the screen pyramid showing the flares for discouraging entrapped insects from escaping; and FIGURE 4 is a top view of the apex of the screen pyramid looking substantially along line 4—4 of FIGURE 2.

Referring now more particularly to the drawings, a fly trap frame is constructed of four corner posts, or standards 12, which are secured by four strips 14 which make up a top frame 16 and by four strips 18 which make up a bottom frame 20. The trap is supported by four corner angles or legs 22 which are secured to the corners of the bottom frame 20 by conventional screws 24. Wire side panels 26 are stapled to the top and bottom frames 16 and 20, respectively and to the corner posts 12 in a manner to prevent insects such as flies from escaping from the trap. A top wire screen panel 28 is secured to the top frame 16 by stapling the screen panel thereto, or in any conventional securing manner. The top panel 28 has one corner thereof detachable to provide a clean-out hole. The clean-out hole is formed by a triangular corner section 30 which is secured to the top frame 16 by two metal strips 32 which are screwed down onto the top frame 16 by conventional wood screws 34. A pyramid screen 36 composed of four triangular sides is secured to the bottom frame 20 of the fly trap by stapling or otherwise securing lateral flanges 38 provided on the pyramid screen, or insect funneling leader 36, to the bottom frame 20. The pyramidal screen is provided with an aperture 40 at the apex thereof. The aperture 40 has upwardly extending outwardly flared wire-ends 42 thereon which project into the interior of the fly trap or cage.

The trap is so designed that the legs 22 hold the body of the fly trap 10 up off the ground so that the trap may be placed over insect bait 44 with the bottom frame 20 held above the ground to allow insects access to the bait and to the bottom of the trap.

The wire, or screen panels 26, 28, and wire pyramid 36 are preferably, but not necessarily made from aluminum or galvanized screen wire. The legs 22 of the fly trap are preferably made of metal angle ½ inch by 3 inch of 26 gauge. The clean-out hole may be opened by removing the screws 34 from the top frame 16 and thereafter the metal strips 32 to pivot the triangular screen section 30 from the top of the fly trap whereafter the dead flies may be emptied from the trap. The bait 44 is placed on the ground, and the trap is thereafter centered over the bait. The legs 22 hold the fly trap off the ground to allow flies and other insects to enter thereunder. The bait may comprise fish, bread soaked in milk, dog manure, or any other refuse or bait that will attract fles. Flies are attracted in great numbers by the bait to gather underneath the fly trap. The flies will rest and walk about on the pyramid screen, or leader 36 and will pass through the aperture 40 into the interior of the fly trap. Since all joints and seams are secured tightly in the manufacture of the trap, there will be no escape from these areas. Since there is no bait inside the holding area of the trap, the life of the insects will not be prolonged by additional feeding of the insects. The flies which are retained within the holding area of the fly trap are discouraged from finding the exit or aperture 40 of the wire pyramid 36 since the pyramid extends into the upper half of the fly trap. It should be noted that the upper ends of the vertical wires or strands at the truncated apex 40 are extended upwardly beyond the apex and are bent laterally and flared outwardly as denoted at 42 (FIGURES 2-4) whereby to provide a ragged edge exit communicating with the cage or trap proper. This raw-edged flare constitutes and provides a guard or deflector which, in turn, minimizes the likelihood of the flies escaping once they are caught in the trap. However, it should be understood that it would be within the purview of the invention to utilize a plain round (or other shaped) exit hole or aperture, that is, without the flaring deflector-type wire-ends, if so desired. Then, too, it is to be pointed out that the upper truncated end 40 of the pyramidal screen or leader 36 can and may be extended up to terminate in a plane close to the top screen panel to let the flies into the trap but to discourage accumulating and clinging of flies to the underneath surface directly over and above the exit opening 40, laying eggs and then unwittingly finding a way of escape as they tend to do.

With a trap as herein disclosed it is only necessary to pile the bait 44 on the ground or other surface and cover it with the elevated leg-supported bottom of the cage or trap. The flies are attracted and in due time crawl, fly or funnel themselves into the trapping cage via the pyramidal funnel or leader 36, from which, generally speaking, there is no escape. No bait is, of course, placed in the screened-in cage. Hence, the trapped flies soon die and can be disposed of in the manner already explained.

This fly trap of improved construction will be of great advantage where there is a heavy use of hydrocarbon insect poisons. It will cut down on the uses of these poisons around farm livestock, which endangers their lives and contaminates meats and dairy products. The fly traps placed in and around barns, dairy parlors and feeding areas will reduce or eliminate the use of most insecticides.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fly trap comprising an open-work frame structure characterized by a horizontal top frame embodying cooperating interconnecting coplanar frame members, a complemental horizontal bottom frame directly beneath and aligned with said top frame and likewise embodying cooperating interconnected frame members, vertical corner posts interposed between and connecting and assembling cooperative corner portions of said top and bottom frames respectively and cooperating therewith in defining vertical side frames, relatively short legs carried by and depending from the respective corner portions of said bottom frame and adapted to support said bottom frame in a plane relatively close to the ground or other foundation, a fine mesh screen panel tautly spanning said top frame and having marginal edge portions fastened atop respectively cooperable frame members of said top frame, a fine mesh screen wire panel distinct and different from said first named panel and tautly spanning each vertical side frame and having marginal portions covering and fastened to exterior surfaces of associated cooperable posts and frame members, each screen wire panel having a bottom portion fashioned into a turned-in flange, said flange underlying and being fastened to an underneath side of the cooperating bottom frame member and further having a flap-like triangular extension, said extension being directed upwardly within the confines of said trap, the respective extensions having marginal portions joined together and cooperating in providing an upwardly tapering truncated fly funneling leader, the truncated apical portion of said leader terminating in a plane below but proximal to the plane of said first named screen panel and providing an entrance leading into said trap, the upper terminal edges of the respective triangular extensions being frayed and providing wire-ends, and said wire-ends being flared upwardly and outwardly and coacting in providing an anti-escape guard, and said guard surrounding said truncated entrance.

2. The trap structure according to claim 1 and wherein one corner portion of said first named screen and panel constitutes a flap, said flap having free edge portions capable of manual movement to an open position to facilitate dumping and discharging collected flies from said trap, the edge portions of said flap being secured to coacting portions of the members of said top frame by readily accessible attachable and detachable strip members.

References Cited

UNITED STATES PATENTS

| 726,604 | 4/1903 | Williamson | 43—118 |
| 871,305 | 11/1907 | Spurrier | 43—118 |
| 1,168,552 | 1/1916 | Richards | 43—118 |
| 1,762,668 | 6/1930 | Schandua et al. | 43—118 |

FOREIGN PATENTS

| 16,225 | 7/1927 | Australia. |
| 195,218 | 3/1923 | Great Britain. |
| 53,369 | 12/1933 | Norway. |

ALDRICH F. MEDBERY, *Primary Examiner.*

SAMUEL KOREN, *Examiner.*